US012669248B2

(12) United States Patent
Pearson

(10) Patent No.: US 12,669,248 B2
(45) Date of Patent: Jun. 30, 2026

(54) GAS LEAK DETECTOR IN GAS APPLIANCES

(71) Applicant: James E. Pearson, Itasca, IL (US)

(72) Inventor: James E. Pearson, Itasca, IL (US)

(73) Assignee: Robertshaw Controls Company, Itasca, IL (US)

( * ) Notice: Subject to any disclaimer, the term of this patent is extended or adjusted under 35 U.S.C. 154(b) by 393 days.

(21) Appl. No.: 18/370,932

(22) Filed: Sep. 21, 2023

(65) Prior Publication Data

US 2024/0093871 A1 Mar. 21, 2024

Related U.S. Application Data

(60) Provisional application No. 63/408,532, filed on Sep. 21, 2022.

(51) Int. Cl.
*F24C 3/12* (2006.01)
*G01M 3/26* (2006.01)
*G08B 21/00* (2006.01)

(52) U.S. Cl.
CPC ................. *F24C 3/12* (2013.01); *G01M 3/26* (2013.01)

(58) Field of Classification Search
CPC . F24C 3/12; F24C 3/126; G01M 3/26; G01M 3/2876; G08B 21/00; G08B 23/00
See application file for complete search history.

(56) References Cited

U.S. PATENT DOCUMENTS

| | | | | |
|---|---|---|---|---|
| 7,987,698 B2 * | 8/2011 | Nakano | ..................... | F17D 5/02 |
| | | | | 73/49.1 |
| 8,305,231 B2 * | 11/2012 | Fujii | ......................... | G01F 1/66 |
| | | | | 700/282 |
| 8,436,738 B2 * | 5/2013 | Bach | ................... | G01M 3/2815 |
| | | | | 340/870.07 |
| 2013/0344446 A1 * | 12/2013 | Barritt | ..................... | F24C 3/126 |
| | | | | 431/12 |

FOREIGN PATENT DOCUMENTS

| | | | | | |
|---|---|---|---|---|---|
| EP | 2365251 B1 | * | 11/2012 | ............... | F24C 3/126 |
| EP | 3675429 A1 | * | 7/2020 | ........... | G05D 7/0635 |
| JP | 2011022150 A | * | 2/2011 | ............... | G01L 7/00 |

* cited by examiner

*Primary Examiner* — Gregory A Wilson
(74) *Attorney, Agent, or Firm* — Miller & Martin PLLC

(57) ABSTRACT

A gas system, such as an appliance or a building has a pressure sensor intermediate a master solenoid valve and at least one valve, wherein when the at least one valve is closed, shut or off, and the master solenoid valve is off, the pressure sensor senses pressure and if pressure drop over a given time exceeds a predetermined amount, an alarm condition is identified (indicating a leak). The master solenoid valve may be maintained shut until the leak is addressed.

14 Claims, 2 Drawing Sheets

GAS LEAK DETECTOR IN GAS APPLIANCES

CLAIM OF PRIORITY

This application claims the benefit of US Provisional Application No. 63/408,532, filed Sep. 21, 2022, which is incorporated herein by reference in its entirety.

FIELD OF THE INVENTION

The present invention relates to providing a pressure sensor and shutoff valve in gas appliances to assist in measuring pressure decay to indicate a possibility of a gas leak somewhere in the gas appliance.

BACKGROUND OF THE INVENTION

There are environmental concerns expressed relating to the amount of methane gas released into the atmosphere. Gas ranges and other appliances are a target of this concern, even when in the off position. One reason for these concerns relating to release of methane when a gas range is in the off position is that a standard four top burner gas range configuration has up to 14 gas connections inside the appliance where gas may be present 100% of the time (on or off, 24 hours a day). Many of the connections of a gas range are single solenoid operated valves which each potentially direct gas flow to specific locations, like top burners, when open. This may provide significantly more connections than other gas appliances such as dryers, furnaces, water heaters, etc. which may have only 2-3 connections to contend with on average, however, even leakage of these could be problematic.

CSA permits a leak rate of 230 cc/hr for components used in gas appliances. Typically, the customer targets the same leak rate (230 cc/hr) for the entire appliance when in the off position. With up to 14 potential leak sources, some new appliances may fail this standard.

The applicant was recently requested by customers to quote supplying similar double solenoid valves to customers for use with gas ranges. The added safety feature of a double solenoid gas valve is that there would be two valve seats which must be open to permit the flow of gas to an oven or broil burner. Double solenoid gas valves are significantly more expensive than single solenoid gas valves, particularly when coupled with the cost of the electronics which would monitor the solenoids. While double solenoid gas valves throughout a range could provide redundancy, such redundancy would certainly come with an increased cost.

Improved gas ranges are believed to be desirable which may be less prone to leakage than prior art appliances. Also if a leak were present, it would be desirable to know such a condition existed and possibly proactively take measures to address the issue.

SUMMARY OF THE INVENTION

It is an object of many embodiments of the present invention to provide an improved gas appliance.

It is another object of many embodiments of the present invention to provide a gas appliance having a shutoff valve in combination with a pressure sensor to at least assist in providing a leak detector when the appliance is off.

It is yet another object of many embodiments of the present invention to provide a gas appliance having a potential leak detector.

Accordingly, it is possible to provide a positive gas shutoff valve to the appliance possibly at the inlet (such as upstream from a gas regulator). This positive shutoff valve, when shut, could be the only potential leak point of the entire system, with potential backup shutoff being at the other valves of the appliance. A pressure sensor, such as a pressure transducer could be inline, such as between the shutoff valve and the rest of the appliance or other appropriate location.

The applicant has solenoid valves capable of meeting the 20 cc/hr leak rate when shut which could function as a shutoff valve, possibly upstream of a pressure regulator. When the appliance is not being used, a pressure sensor or transducer could measure the pressure and a processor analyze decay to potentially indicate that the appliance has a leak. If a leak is detected, a variety of actions could take place, such as notifying the consumer, a service technician or maintaining the shutoff valve shut, etc.

At least one valve of the applicant has a rating of 119,000 BTU/hr which exceeds the requirement for most gas stoves in the United States. This or other valves could be CE rated, permitting use in appliances in Europe. By placing such a valve upstream of a gas regulator in a gas range, this shutoff valve could provide redundancy when coupled to electronics that control the operation of the valve which can provide the logic of if all valves are off, then the shutoff valve could be shut as well. Meanwhile, a pressure transducer or other pressure sensor could provide a signal to electronics (as a processor) to advise if pressure is decaying downstream of the shutoff or other valve.

By providing the electrically controlled shutoff at or near the inlet to the appliance, and preferably at least upstream of a pressure regulator, with a pressure sensor provided in the normal gas flow path of the appliance downstream of the shutoff valve, when open, this pressure sensor can potentially assist in detecting leakage when the shutoff valve is off, closed or shut.

A shutoff valve at the inlet could work in series with the pressure sensor. This series arrangement may permit an alert to be sent advising of a potential safety issue. A whole house could potentially regulate with a meter to advise of a leak existing somewhere downstream of a shutoff valve (that is shut).

For many embodiments, providing a shutoff would employ a gas valve and a pressure sensor and an electronic ignition system (since when the master shutoff valve is shut, there will probably not be a flow or supply of gas available for a pilot light which could otherwise indicate pressure decay).

With such a construction, the first valve (shutoff valve) provides enough BTU capacity to provide flow (when open) for the entire gas appliance for many embodiments such as a gas range: i.e., enough for all of the top burners, as well as the bake and broil elements. An electronics module would preferably control ignition, flame supervision, and provide valve drive for both bake and broil valves. The pressure transducer would sense pressure, potentially when the shutoff valve is off, shut or closed. If pressure in the appliance decays after shutting the valve, it is possible a leak exists (or a valve left open, etc.). Multiple pressure sensors could be used for redundancy and/or to localize a source of a leak such as at a cooktop valve, etc.

When in the off position, no gas is provided downstream of the first valve. Gas is preferably stopped at the first valve, possibly at the inlet. When there is a call for heat, the electronics provides a signal to the first valve to open. Gas then flows as directed toward the bake and broil elements, but first would need to pass through the appropriate bake solenoid valve (second solenoid valve) or broil solenoid valve (third solenoid valve) depending upon the particular operation desired for the range.

If the direction is for bake, the bake solenoid would open, the electronics would ensure ignition, and the desired temperature and flame would be monitored as directed by the user together with the electronics module. If ignition is not completed in a specified amount of time, the entire system (including the first valve) would shut down. i.e., the master solenoid valve would shut. The electronics module may permit a selected number of purge attempts before potentially shutting down the appliance completely until a service technician permitted continued attempts.

Apart from bake and broil burners (and their second and third valves) for a two burner system, top burners, electrodes (bake and broil) which could act as both igniters and flame sense could be provided, gas pressure regulation systems, and other systems could be provided with more sophisticated ranges. Other gas appliances may benefit from the technology disclosed herein.

BRIEF DESCRIPTION OF DRAWINGS

The particular features and advantages of the invention as well as other objects will become apparent from the following description taken in connection with the accompanying drawings in which.

DETAILED DESCRIPTION OF THE PREFERRED EMBODIMENTS

Figure 1:
FIG. 1 is a schematic representation of a gas appliance of a presently preferred embodiment of the present invention.
Figure 1:
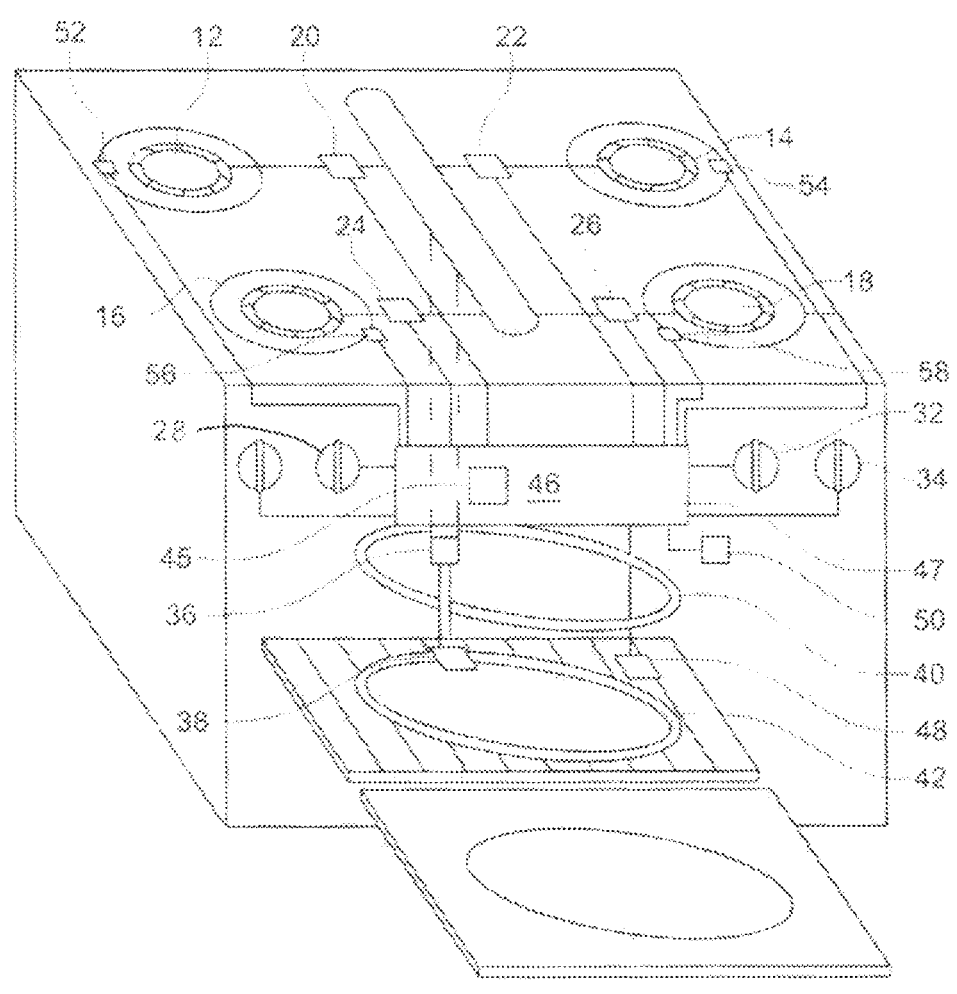

A gas appliance 10 in the form of a gas range is shown of relatively straight forward complexity in FIG. 1. Four top burners 12,14,16,18 each fed by respective single solenoid valves 20,22,24,26 are provided. Other top burners may be fed by analog or mechanical valves directly operated by knobs 28,30,32,34, respectively as are known in the art. Regardless of the type(s) of valve(s) used with the top burners, 12-18, each is respectively ignited with electric ignition systems 52,54,56,58 when desired to operate. Ignition/flame sensors are often part of the ignition systems 52-58.

Many gas ranges regardless of the sophistication of their top burners 12-18 will have at least a bake burner 42 controlled with a solenoid or bi-metal valve, in this case identified as second solenoid valve 38. Many gas ranges will also have a broil burner 40 which may be controlled by solenoid or bi-metal valve, in this case identified as third solenoid valve 36.

The solenoid valves receive input to open from an electronic module 46, which may also include a touch display 47 for the user to control operation of the appliance 10. Bake and broil burners 42,40 will also have corresponding electronic ignition systems 48,50 to ignite the burners when desired which may also provide ignition/flame sensors.

When the stove or appliance 10 is off gas would proceed from an external source 60 (either natural gas, propane, etc.) normally at a residential home through a gas regulator 62 to manifold 64 supplying the various valves 20-26, 36,38. Gas would be within the manifold 64 at 100%, 24 hours a day.

The applicant has installed a master solenoid valve, first valve 44 which has an open and a shut configuration. The first valve 44 is opened when the electronic control module 46 upon receiving an input requiring heat at any of the top burners 12-18 or the bake or broil burner 42,40. The first valve 44 is further shut by the electronic control module 46 when no signal is received, such as in the event of power failure, or when the electronic control module 46 recognizes an off condition of the range, such as if none of the top burners 12-18 and the oven (both bake and broil burners 42,41) are off), or when a leak is detected as will be explained below.

First valve 44 can preferably be located at or near the inlet 66 upstream of the pressure regulator 62 so that it may solve two issues at the same time: (a) cut the allowable off position leak rate by up to or exceeding 90% of the allowable leak rate (or permit achieving a minimal leak rate), and (b) add redundancy, so that if any of the other valves in the system were to leak by, shutting the first valve 44 would secure gas pressure upstream of that valve to no more than the gas in the manifold 64. At least some first valves 44 manufactured by the applicant have a rating of 119,000 BTU/hr which is greater than the BTU requirements for most gas ranges sold into the United States. Furthermore, many first valves 44 may already be CE rated for sale into the European market.

Having a shutoff valve, first valve 44, at the inlet 66 could work in series with pressure sensor 70 which could be a pressure transducer or other appropriate sensor which measures pressure. A signal may be provided to electronic module 46 or other processor to evaluate pressure decay downstream of the first valve 44. Upon detecting a leak, such as a leak rate above a predetermined minimum, a variety of actions may be implemented such as notifying people (the consumer, maintenance, technician, etc., to having the first valve 44 remain shut until the condition is addressed or cleared by a technician, etc.). Alerts may be displayed on a display 45, such as a touch screen display, of the electronic module 46 and/or sent. A whole house could be sensed, such as if a shutoff were placed downstream of a gas meter. If decay rate over a period of time exceeds a certain limit, actions may be taken, preferably automatedly such as described above or otherwise.

In all of these embodiments, an electronic ignition module is provided either as a portion of the electronic control module 46 or separately as electronic ignition systems 52-58 and 48, 50 for the various burners since the gas will be secured when not in use.

In these various embodiments, the first valve 44 has enough BTU capacity to supply the entire range 10 (enough for all top burners, bake and broil burners). The first valve 44 is also preferably manufactured in an effort to meet a predetermined maximum leak rate, currently 20 cc/hr, but other specification could be provided for other embodiments. The second, third and other solenoid valves 36,38 (20-28, and/or others) are all in series, possibly separately with the first valve 44. These other valves 36,38, 20-28, etc. also control the bake, broil elements, top elements, etc. The electronic module 46 controls ignition, flame supervision, valve drive for both bake and broil valves, as well as possibly the top burners, if they employ solenoid valves as well.

In the off position, no gas is preferably received downstream of the first valve 44. Gas stops as the inlet of the first valve 44. The pressure sensor 70 would then detect change in pressure, such as would occur if there was a leak in the appliance or range 10. If there is a call for heat by a portion of the appliance 10, the electronic control module 46 sends a signal to open the first valve 44 in addition to the valve(s) needed to perform the desired function. If the ignition process is not completed within the specified amount of time, the specific solenoid is shut (such as the bake or second solenoid valve 38) possibly also with the first solenoid valve 44. The first solenoid valve 44 is also shut when shutting the second solenoid valve 38 (for some embodiments, the electronic module 46 will employ logic to ensure no other valve is open providing heat before directing the first valve 44 to be shut. If the bake solenoid were the only burner supposed to be working, then the electronic control module 46 could allow a specified amount of purge times and attempt a set number of relighting attempts before shutting down completely (which would shut the first valve 44, potentially regardless of other operations of the appliance 14) desired at the time). It may be that the alarm condition would need to be cleared by a technician before the controller or processor, such as in the electronic module Other components could be added to the system apart from just a single burner controlled by a second solenoid valve having a corresponding electronic ignition control for varying degrees of complexity and sophistication along with a pressure sensor. Bake and broil elements both could be provided with corresponding solenoid valves; electrodes (possibly for both bake and broil) could be provided which act as both ignitors and flame sensors could be used with the electronic ignition controls; gas pressure regulation and other features could also be provided. Pressure sensors 70 could be employed downstream of other valves such as any of valves 36,38 (20-24) could also be utilized to advise if a portion of the system has a leak in a similar manner to potentially assist in locating the leak.

Figure 3:
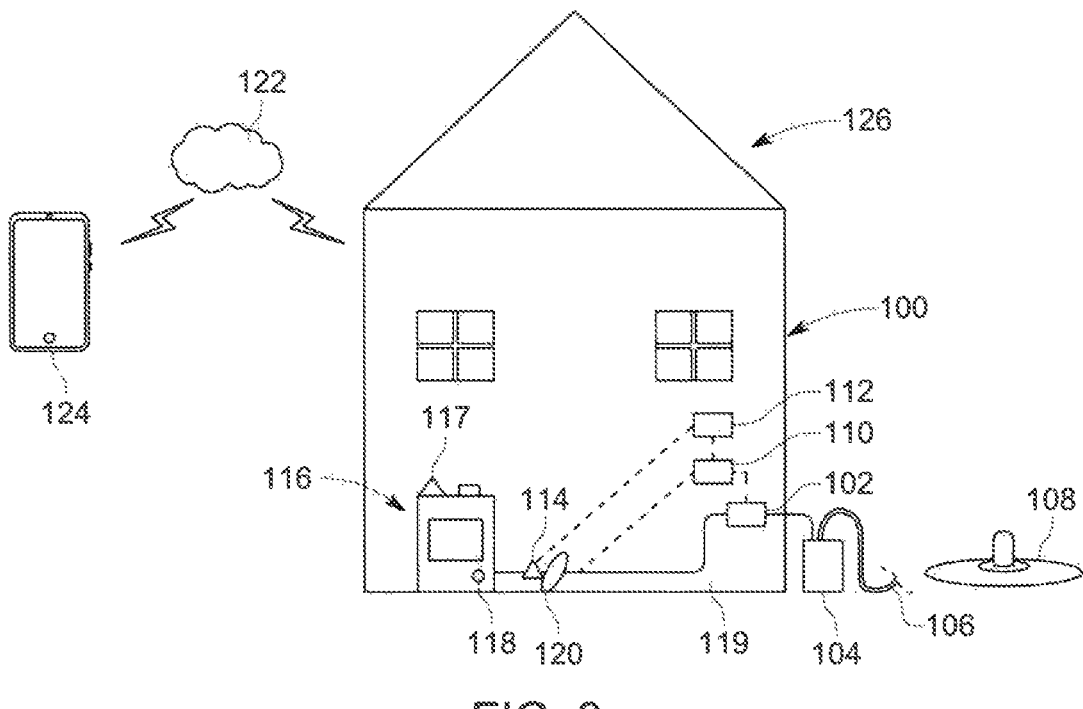
FIG. 3 is a schematic representation of a house having the gas appliance of FIGS. 1 and 2 therein.

For a home based system (or other building), as shown in FIG. 3 as system 100, a master solenoid valve 102 is preferably located downstream, but could possibly be upstream of a gas meter 104, if utilized, providing gas from a supply inlet 106 such as a gas utility company, a storage tank, etc. If no gas meter is utilized, such as may be the case if a building relies on propane from a tank, 108, then the master solenoid valve 102 need only be in communication with controller 110, possibly even remotely, such as through wi-fi or otherwise as could be accomplished with a router 112 or other appropriate device. The controller 110 is also preferably in communication with a target valve 114, which could be a valve connected to a first appliance 116 which is preferably in a normally off configuration. The appliance 116 has some type of burner whether it be a range top burner 117, an oven burner, a gas water heater burner, an hvac burner, or other burner. A manifold 119 connects the master solenoid valve or first valve 102 to the at least one valve, such as target valve 114 or appliance or internal valve 116. Target valve 114 could be the a shutoff valve at a connection to an appliance 116.

When any portion of the first appliance 116 requires a supply of gas, then the first valve 114 is open, or opened, and the master solenoid valve is open. When the first appliance 116 is not in use, preferably, the first valve 114 is shut, although the target valve 114 could be an internal valve 118 of the first appliance 116, and with the first valve 114 (or 118) shut, as communicated to the controller 110, such as through wi-fi or otherwise, the controller directs the closing of master solenoid valve 102 (assuming that all other appliances are not requiring gas at the time). When all of the appliances, including first appliance 116 are not using gas, a pressure sensor 120 senses gas pressure and as long a drop in gas pressure does not exceed a predetermined rate or amount as determined by the controller 110, there is no detected leak.

Figure 2:
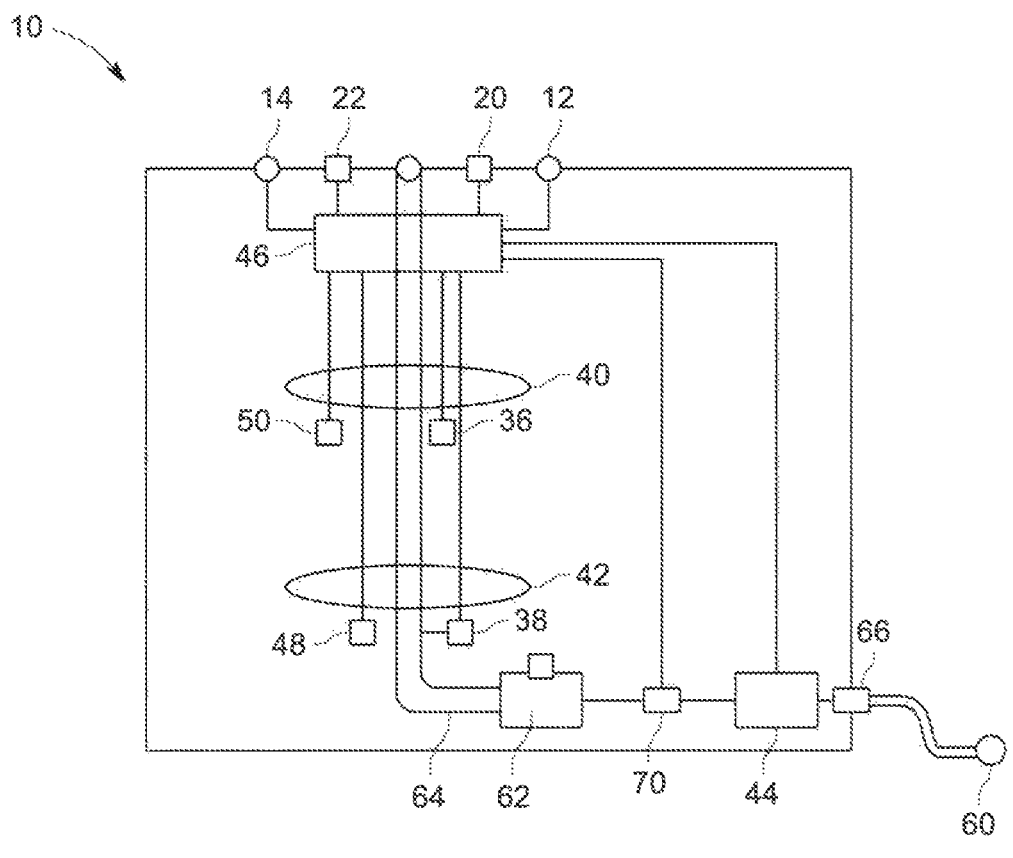
FIG. 2 is a rear plan view of the gas appliance of FIG. 1.

However, the controller 110 receives an output signal from the pressure sensor 120 so that if a leak is detected, then a display at the controller 110 may indicate an alarm condition or alert which could be visual. An audible alarm may also be activated. When in the alarm condition, it is preferable for many embodiments that the master solenoid valve 102 remains closed until the alarm condition is cleared by a technician. Like the embodiment of FIGS. 1-2 the alarm condition may be relayed remotely, such as through the internet 122 to a computing device 124, such as a computer, tablet or smartphone of a user, whether that be the occupant of the building 126, a technician, a service provider and/or other party. It may be that the alarm condition must be cleared by a technician before the master solenoid valve 102 may be opened. Thus, the building 126 may function similarly to the appliance 10 to provide a leak detector in an effort to provide additional safety to those in the building 126 by indicating a potential leak (which may or not be an actual leak, but is at least able to identity an initially unexplained pressure drop which would likely be related to a gas leak-).

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

What is claimed is:

1. A gas system having a leak detector comprising:
at least one valve upstream of a burner and in fluid communication therewith;
a controller;
an external gas source providing gas to an inlet of the system;
a master solenoid valve upstream of the at least one valve and in fluid communication therewith through a manifold, wherein when the at least one valve is in a closed position, the master solenoid valve receives a signal to close; and when in the open position, gas flows through the master solenoid valve to the manifold;
a sensor located downstream of the master solenoid valve and upstream of the at least one valve, said sensor providing an output signal relative to pressure to the controller; and if the controller detects that the master solenoid valve is in a closed position and the change in pressure exceeds a predetermined minimum; said controller directing an alert related to a perceived leak in the gas system; and a pressure regulator, wherein the master solenoid valve is located upstream of the pressure regulator.

2. The gas system of claim 1 wherein the gas system is one of a building and a gas appliance.

3. The gas system of claim 1 wherein the at least one valve is one of a plurality of cooktop burners of a range.

4. The gas system of claim 1 wherein the at least one valve is for one of a bake and a broil element in a gas stove.

5. The gas system of claim 1 further comprising a display, and the alert is displayed on the display.

6. The gas system of claim 5 wherein the display is a touch screen display.

7. The gas system of claim 1 wherein the at least one valve is a solenoid valve.

8. The gas system of claim 7 wherein the controller directs operation of the at least one valve.

9. The gas system of claim 1 wherein the master solenoid valve opens upon receipt of a signal by the controller to open the at least one valve.

10. The gas system of claim 9 wherein if all of the at least one valve are in a closed position, the master solenoid valve is provided a signal by the controller to be in the closed position.

11. The gas system of claim 9 further comprising an ignition system proximate to the burner and if the burner is not detected as being lit in a specific period of time, shutting the at least one valve and the master solenoid valve.

12. The gas system of claim 1 wherein the controller sends an alert towards a remote location.

13. The gas system of claim 12 wherein a technician must clear the alert before the master solenoid valve can be opened by the controller.

14. The gas system of claim 1 wherein a technician must clear the alert before the master solenoid valve can be opened by the controller.

* * * * *